United States Patent Office 2,817,642
Patented Dec. 24, 1957

2,817,642
COMPOSITIONS OF ACID-RADICAL CONTAINING CONJUGATED DIENE COPOLYMERS AND ALUMINUM POWDER AND METHOD OF PREPARATION

Carl A. Uraneck, Phillips, Tex., assignor to Phillips Petroleum Company, a corporation of Delaware No Drawing. Application October 7, 1954, Serial No. 461,033

17 Claims. (Cl. 260—41.5)

This invention relates to the use of aluminum powder as a reinforcing agent for acid radical-containing rubbery polymers. In a further aspect, this invention relates to a method for obtaining an improved rubber by using, as a reinforcing agent, aluminum powder instead of carbon black.

In the manufacture of various rubbery products, it is conventional to compound with raw rubber a variety of materials. Such products as rubber hose, conveyor belts, gaskets and tire tread stocks require varying physical properties such as tensile strength, resilience, and the like. One of the important problems, however, is that frequently a compounded rubber, containing the amount and variety of compounding materials necessary for the use intended for the final rubbery product, possesses physical properties which make the processing of this compounded rubber very difficult.

Such an important physical property in the processing of rubber products is the Mooney value. Whereas a relatively high Mooney value often is desirable in the final rubbery product, a relatively high Mooney value makes the shaping and processing of the rubber very difficult. Ignoring the presence of plasticizers and/or extender oils which are specifically added to control the Mooney value, the reinforcing agent, normally carbon black, probably exerts as great or greater effect on the Mooney value of a compounded rubber than does any other ingredient of the rubber compounding recipe.

It is an object of this invention, therefore, to provide a new method for reinforcing a rubber.

It is a further object to provide a method for reinforcing a rubber which does not increase the Mooney value during the original mixing step.

It is a still further object to provide a method for reinforcing a rubber which does not increase the Mooney value as much as the Mooney value is increased when carbon black is used as the reinforcing agent. Other objects will be apparent from the following description.

I have discovered that aluminum powder is an effective reinforcing agent for acid radical-containing rubbery polymers and that, surprisingly, reinforcement of such polymers with aluminum powder does not increase the Mooney value of the compounded rubber during the original mixing or compounding step nearly as much as does reinforcement of these polymers with carbon black. This latter attribute provides an important advantage for the use of aluminum powder as a reinforcing agent for such rubbery polymers since a raw rubber having a higher initial Mooney value can be compounded and processed than is the case when carbon black is used. I have found, further, that the remarkable reinforcement by aluminum powder of acid radical-containing rubbery polymers does not occur in rubbery polymers which do not contain acid radicals, such as a GR-S rubber. The acid radical-containing rubbery polymers reinforced with aluminum powder in accordance with this invention have other good properties which will be demonstrated in the examples herein, such as good tensile strength, particularly after aging, and good flexibility. Furthermore, these acid radical-containing rubbery polymers reinforced with aluminum powder are resistant to ozone.

The aluminum powder has particle sizes encompassing the same ranges as those generally ascribed to colloidal particles, i. e., sizes between one micron and one millimicron, the preferred size is the upper range of the particle sizes of carbon black conventionally used as the reinforcing agent for rubber, i. e., in the range from 200 to 1500 Angstrom units. Such aluminum powder can be manufactured by any suitable grinding or milling system such as, for example, a colloid mill. The aluminum powder used in the examples set forth below had thickness in the upper range of that ascribed to reinforcing carbon black, approximately 1500 Angstrom units.

The amount of the aluminum powder used in reinforcing the acid radical-containing rubbery polymers in accordance with this invention depends upon several variables including the number of acidic radicals in the rubbery polymer and the ultimate use of the rubbery product. In general, the amount of the aluminum powder used is in the range from 1 to 80 parts by weight per 100 parts by weight of the polymer. Amounts of the aluminum powder in the range from 5 to 50 parts by weight per 100 parts by weight of the rubbery polymer are preferred because a compounded rubber is thereby produced which has a good balance of physical properties, such as tensile strength, resilience and Mooney value.

Acidic monomers, or monomers which contain at least one acid radical per molecule which are applicable, include acrylic acid, alpha- and beta-chloroacrylic acid, and various alpha- and beta-alkyl-substituted derivatives in which the alkyl radical contains from one to eight carbon atoms, such as methacrylic acid, crotonic acid, alpha- and beta-ethyl-, propyl-, butyl-, amyl-, hexyl-, heptyl-, and octylacrylic acids, phenylacrylic acids, i. e., atropic and cinnamic acids, and vinylacrylic acids. Unsaturated dicarboxylic acids such as fumaric, maleic, itaconic, teraconic, and citraconic acids are also applicable, along with derivatives thereof such as monoesters from methyl to octyl, alkyl derivatives, i. e., alkyl radicals from methyl to octyl attached to the central carbon atoms, and halogen-substituted derivatives such as chloromaleic acids. Of the acidic monomers which are applicable, acrylic, methacrylic, and chloroacrylic acids are preferred. The acidic monomer may also contain sulfonic, boric, phosphonic, acid sulfate, or acid phosphate radicals as well as carboxy radicals.

Materials which are copolymerized with the acidic monomers are conjugated dienes which preferably contain from four to eight, inclusive, carbon atoms per molecule and include 1,3-butadiene, isoprene(2-methyl-1,3-butadiene), piperylene, 2-methyl-1,3-pentadiene, 2,3-dimethyl-1,3-butadiene, chloroprene, and others. With a greater number of carbon atoms, the polymerization rate decreases somewhat, and there are so many isomers, that it is not practical, with present procedures, to provide pure compounds. However, in a broader aspect of the invention, conjugated dienes having more than eight, such as twelve, carbon atoms per molecule can be used, particularly where the presence of various isomeric compounds can be tolerated. Furthermore, various alkoxy, such as methoxy and ethoxy, and cyano derivatives of these conjugated dienes are also applicable. Thus, dienes, such as phenylbutadiene, 2,3-dimethyl-1,3-hexadiene, 2-methoxy-3-ethyl butadiene, 2-ethoxy-3-ethyl-1,3-hexadiene, 2-cyano-1,3-butadiene, and 2,3-diethyl-1,3-octadiene are applicable. A single conjugated diene can be polymerized with an acidic monomer or conjugated dienes can be used in admixture with each other or with other polymerizable compounds in addition to the acidic monomers, i. e., terpolymers are applicable in this invention as well as copolymers. In the case of copolymers, the use of monoolefins with an acid alone is not contemplated since, under some conditions, only a 1–1 addition product is formed, not a high molecular weight polymer.

As the third component in the case of terpolymers, any unsaturated compound which contains a terminal $$CH_2=C<$$

group can be used. Among the compounds which are applicable are styrene, alpha-methylstyrene, various halogen-, alkyl-, and alkoxy-substituted styrenes, acrylonitrile, methacrylonitrile, methyl acrylate, ethyl acrylate, propyl acrylates, butyl acrylates, and the corresponding methacrylates, methyl vinyl ether, methyl isopropenyl ketone, vinyl chloride, vinylidene chloride, vinyl acetate, methyl vinyl ketone, etc. Any of these compounds could, of course, be individually copolymerized with the acid monomer to form copolymers. Many other compounds are applicable, but it is necessary that only those compounds be used which do not react with the acid radicals of the adidic monomers.

The polymers can be prepared by any method known to the art, such as mass or emulsion polymerization. When they are prepared by emulsion polymerization, acid-side recipes are used and the pH of the aqueous phase is generally below 4.

While direct polymerization methods, as discussed above, are generally preferred, it is to be understood that any methods can be employed for the preparation of rubbery copolymers containing at least one acid radical. For example, they can be prepared by indirect methods, i. e., by treatment of a polymer under suitable conditions to convert any radicals present to acidic radicals or to introduce acidic radicals into the polymer. Such methods include hydrolysis of copolymers containing a multiplicity of —CN radicals, graft-type polymerization wherein a carboxy-containing monomer is polymerized in the presence of an unsaturated polyelectrolyte, or any other method which will yield the desired polymer.

Rubbery polymers which are the most important, commercially, which are used in this invention and which are, therefore, preferred are acrylic acid-1,3-butadiene copolymer, methacrylic acid-1,3-butadiene copolymer, acrylic acid isoprene copolymer, acrylic acid-chloroprene copolymer, and acrylic acid-2,3-dimethyl-1,3-butadiene copolymer.

The acid radical-containing monomer is employed in an amount in the range of from 1 to 60 parts by weight based on 100 parts by weight of the total monomeric material. Rubbery polymers having a greater variety of uses due to a greater flexibility and resilience are prepared when the amount of the acid radical-containing monomer employed is in the range of 20 to 40 parts by weight.

Other ingredients conventionally employed in producing rubbery polymers can be used, such as plasticizers, antioxidants, vulcanizing agents, cross-linking agents, pigments and the like, the only limitation being that these other materials must not react with the acid radical-containing rubbery polymer to an extent that prevents the aluminum powder from reinforcing the polymer.

EXAMPLE I 1,3-butadiene was copolymerized with acrylic acid in an aqueous emulsion system at 41° F. in accordance with the following recipe:

| Ingredient: | Parts by weight |
| --- | --- |
| Butadiene | 70.0 |
| Acrylic acid | 30.0 |
| Water | 180.0 |
| Duponol ME [1] | 4.0 |
| Sulfole [2] | 0.8–0.9 |
| Dioxo 7 [3] | 0.104 (0.5 millimole) |
| $K_4P_2O_7$ | 0.165 (0.5 millimole) |
| $FeSO_4 \cdot 7H_2O$ | 0.139 (0.5 millimole) |
| KCl | 0.1 |

[1] Sodium lauryl sulfate.
[2] tert-Dodecyl marcaptan.
[3] tert-Butylisopropylbenzene hydroperoxide.

The above system was copolymerized to a conversion of about 60 percent. The raw, rubbery, acid radical-containing polymer thus produced had a Mooney value (MS-1½) of 11.5 and was compounded using 5 and 25 parts by weight per 100 parts by weight rubber of aluminum powder as a reinforcing agent instead of carbon black.

A comparison test was made using 25 parts by weight of carbon black per 100 parts by weight of the butadiene-acrylic acid rubber produced above.

A further comparison test was made using the same amount of carbon black in a butadiene-styrene rubber prepared in an iron-pyrophosphate activated, aqueous emulsion, sugar-free recipe at 41° F., having a Mooney value (ML–4) of 49. These compounding recipes were as follows:

| Ingredient | Parts by Weight | | | |
| --- | --- | --- | --- | --- |
| | I | II | III | IV |
| Butadiene-acrylic acid rubber | 100 | 100 | 100 | ---- |
| Butadiene-styrene rubber | ---- | ---- | ---- | 100 |
| Carbon black [1] | ---- | ---- | 25 | 25 |
| Aluminum powder | 5 | 25 | ---- | ---- |
| Zinc oxide | 1 | 1 | 1 | 3 |
| Stearic acid | 1 | 1 | 1 | 1 |
| Agerite Resin D [2] | 1 | 1 | 1 | 1 |
| Paraflux [3] | 5 | 5 | 5 | 5 |
| Staybelite Resin [4] | 2.5 | 2.5 | 2.5 | 2.5 |
| Sulfur | 2.5 | 2.5 | 2.5 | 2.5 |
| Santocure [5] | 1.5 | 1.5 | 1.5 | 1.5 |
| A-32 [6] | 0.3 | 0.3 | 0.3 | 0.3 |

[1] Philblack O.
[2] Polymerized trimethyldihydroquinoline.
[3] Saturated polymerized hydrocarbon.
[4] Hydrogenated rosin.
[5] N-cyclohexyl-2-benzothiazylsulfenamide.
[6] Reaction product of butyraldehyde and butylidene aniline.

Stocks from the above compounding recipes were milled, cured 30 minutes at 307° F. and their physical properties determined. These properties are recorded below in Table I.

Table I

| | Compounded Rubbers | | | |
| --- | --- | --- | --- | --- |
| | I | II | III | IV |
| Physical Properties Unaged: | | | | |
| 212° F. Compression set, percent | 10.4 | 9.6 | 10.1 | 9.3 |
| 300 percent Modulus, p. s. i., 80° F. | 990 | 1,940 | 1,760 | 1,110 |
| Tensile, p. s. i., 80° F. | [1] 1,370 | 2,225 | 3,400 | [2] 1,690 |
| Elongation, percent, 80° F. | 365 | 400 | 430 | 380 |
| 200° F. Tensile, p.s.i., 45 minute cure | 210 | 710 | 710 | 600 |
| ΔT, °F | 44.6 | 53.7 | 55.4 | 29.8 |
| Resilience, percent | 23.2 | 21.8 | 17.4 | 74.9 |
| Mooney value (MS-1½) | 23.5 | 26.5 | 32.5 | 24.9 |
| Oven Aged 24 Hours at 212° F.: | | | | |
| Tensile, p. s. i., 80° F. | 1,700 | 2,610 | 2,570 | 1,330 |
| Elongation, percent, 80° F. | 270 | 240 | 250 | 290 |
| ΔT, °F | 47.3 | 51.3 | 55.1 | 26.3 |
| Resilience, percent | 17.3 | 16.1 | 15.1 | 79.8 |

[1] 1,840 p. s. i., after curing 45 minutes.
[2] 2,200 p. s. i., after curing 45 minutes.

The data reported above in Table I show that aluminum powder is an effective reinforcing agent for the butadiene-acrylic acid rubber. The tensile strength of the aluminum powder reinforced rubber is very good, particularly in view of the fact that these compounded rubbers contain no carbon black. Furthermore, the compounded Mooney value of mixture II, containing 25 parts by weight of aluminum powder, is less than that of mixture III, containing 25 parts by weight of carbon black.

EXAMPLE II

Further tests were made using the butadiene-styrene rubber described in Example I to determine whether this rubber is reinforced by aluminum powder. In one test, 50 parts by weight of aluminum powder was used, and in the other test, 50 parts by weight of carbon black was used, each based on 100 parts by weight of the rubber.

No other compounding ingredients were used. The results of these tests are recorded below in Table II.

Table II

| Reinforcing Agent | Tensile, p. s. i., 80° F. | Elongation, percent, 80° F. | 212° F. Compression Set, percent |
|---|---|---|---|
| Carbon black [1] | 3,560 | 500 | 11.8 |
| Aluminum powder | 110 | 470 | 15.7 |

[1] Philblack O.

The data in Table II show that no reinforcement was imparted to the butadiene-styrene rubber by the aluminum powder.

EXAMPLE III

Tests were made using the butadiene-acrylic acid rubber of Example I to determine the increase in Mooney value during the original mixing step, using either aluminum powder or carbon black. Also, tests were made in the same way, but using powdered iron or zinc to determine if these metals afford the same advantage with respect to increase of Mooney value during initial mixing as is afforded by powdered aluminum. These reinforcing agents were added to the rubber by mixing on a roll mill. No other compounding ingredients were used. The increases in Mooney values (MS-1½) are shown in Table III.

Table III

| Reinforcing Agent | Amount, parts by weight per 100 parts by weight rubber | Mooney value (MS-1½) |
|---|---|---|
| Aluminum powder | | 11.5 |
| Aluminum powder | 25 | 15 |
| Aluminum powder | 50 | 16 |
| Iron powder | 50 | 32 |
| Zinc powder | 50 | 46.5 |
| Carbon black [1] | 50 | 28 |

[1] Philblack O.

The tests reported in Table III demonstrate that aluminum powder increases the Mooney value during the original mixing step much less than the carbon black increases the Mooney value and that powdered iron and zinc increase the Mooney value even more than carbon black does. Thus, an acid radical-containing rubber having a higher raw Mooney value can be processed if aluminum powder is used as the reinforcing agent than if carbon black is employed as the reinforcing agent. This advantage is very important because tire tests with GR-S rubber have shown that tread wear increases about one percent with each increase of 3 to 4 units of Mooney value.

Specimens of the butadiene-acrylic acid rubber of Example I reinforced with aluminum powder and specimens of the same rubber reinforced with carbon black were tested after exposure to ozone. The specimens which were reinforced with aluminum powder were more flexible than the carbon black reinforced specimens after this exposure.

In addition to the advantages set forth above, the aluminum powder reinforced rubber has a silvery appearance which enhances the decorative value of the rubber for such uses as automobile stripping, tire sidewalls, footwear, hose, and the like.

From a consideration of the foregoing specification, it will be appreciated that changes can be made in the details therein given without sacrificing any of the advantages thereof or departing from the scope of the invention.

I claim:

1. A method for reinforcing an acid radical-containing rubbery copolymer which comprises admixing together said polymer and aluminum powder, said copolymer resulting from interpolymerization of monomers comprising a conjugated diene and an acid radical-containing monomer possessing ethylenic unsaturation.

2. A composition of matter comprising an acid radical-containing rubbery copolymer containing aluminum powder, said copolymer resulting from interpolymerization of monomers comprising a conjugated diene and an acid radical-containing monomer possessing ethylenic unsaturation incorporated therein.

3. A method for producing an improved rubber which comprises copolymerizing monomeric materials comprising an acid radical-containing monomer possessing ethylenic unsaturation and a conjugated diene to produce an acid radical-containing rubbery polymer, and compounding said polymer with compounding ingredients comprising aluminum powder as a reinforcing agent.

4. A method for producing an improved rubber, which comprises copolymerizing monomeric materials comprising from 1 to 60 parts by weight of an acid radical-containing monomer possessing ethylenic unsaturation, based on 100 parts by weight of the total monomeric material, and a conjugated diene to produce an acid radical-containing rubbery polymer, and admixing with said polymer from 1 to 80 parts by weight of aluminum powder based on 100 parts by weight of said polymer.

5. A method in accordance with claim 4 wherein said polymer is a methacrylic acid-1,3-butadiene copolymer.

6. A method in accordance with claim 4 wherein said polymer is an acrylic acid-isoprene copolymer.

7. A method for producing an improved rubber which comprises copolymerizing monomeric materials comprising 20 to 40 parts by weight of an acid radical-containing monomer possessing ethylenic unsaturation, based on 100 parts by weight of the total monomeric material, and a conjugated diene to produce an acid radical-containing rubbery polymer, and admixing with said polymer from 5 to 50 parts by weight of aluminum powder, based on 100 parts by weight of said polymer.

8. A composition of matter comprising an acid radical-containing rubbery copolymer containing 1 to 80 parts by weight, based on 100 parts by weight of said copolymer, of aluminum powder, said copolymer resulting from interpolymerization of monomers comprising a conjugated diene and an acid radical-containing monomer possessing ethylenic unsaturation incorporated therein.

9. A composition of matter comprising an acid radical-containing rubbery copolymer containing 5 to 50 parts by weight, based on 100 parts by weight of said copolymer, of aluminum powder, said copolymer resulting from interpolymerization of monomers comprising a conjugated diene and an acid radical-containing monomer possessing ethylenic unsaturation incorporated therein.

10. A composition of matter in accordance with claim 9 wherein said polymer is a methacrylic acid-1,3-butadiene copolymer.

11. A composition of matter in accordance with claim 9 wherein said polymer is an acrylic acid-isoprene copolymer.

12. A composition of matter in accordance with claim 9 wherein said polymer is an acrylic acid-chloroprene copolymer.

13. A composition of matter in accordance with claim 9 wherein said polymer is an acrylic acid-2,3-dimethyl-1,3-butadiene copolymer.

14. A method for producing an improved rubber, which comprises copolymerizing monomeric materials comprising from 1 to 60 parts by weight of acrylic acid, based on 100 parts by weight of total monomeric materials, and 1,3-butadiene to produce an acid radical-containing rubbery polymer, and admixing with said polymer from 1 to 80 parts by weight of aluminum powder based on 100 parts by weight of said polymer.

15. A composition of matter comprising a rubbery acrylic acid-1,3-butadiene copolymer containing 5 to 50 parts by weight, based on 100 parts by weight of said copolymer, of aluminum powder incorporated therein.

16. A method for reinforcing an acid radical-containing rubbery copolymer which comprises admixing together said copolymer and aluminum powder, said rubbery copolymer being selected from the group consisting of acrylic acid-1,3-butadiene copolymer, methacrylic acid-1,3-butadiene copolymer, acrylic acid-isoprene copolymer, acrylic acid-chloroprene copolymer, and acrylic acid-2,3-dimethyl-1,3-butadiene copolymer.

17. A composition of matter comprising an acid radical-containing rubbery copolymer containing 1 to 80 parts by weight, based on 100 parts by weight of said copolymer, of aluminum powder incorporated therein, said rubbery copolymer being selected from the group consisting of acrylic acid-1,3-butadiene copolymer, methacrylic acid-1,3-butadiene copolymer, acrylic acid-isoprene copolymer, acrylic acid-chloroprene copolymer, and acrylic acid-2,3-dimethyl-1,3-butadiene copolymer.

References Cited in the file of this patent
UNITED STATES PATENTS
2,099,241  Stewart _____ Nov. 16, 1937